R. E. HELLMUND.
SYSTEM OF CONTROL.
APPLICATION FILED APR. 12, 1916.
1,315,958.
Patented Sept. 16, 1919.
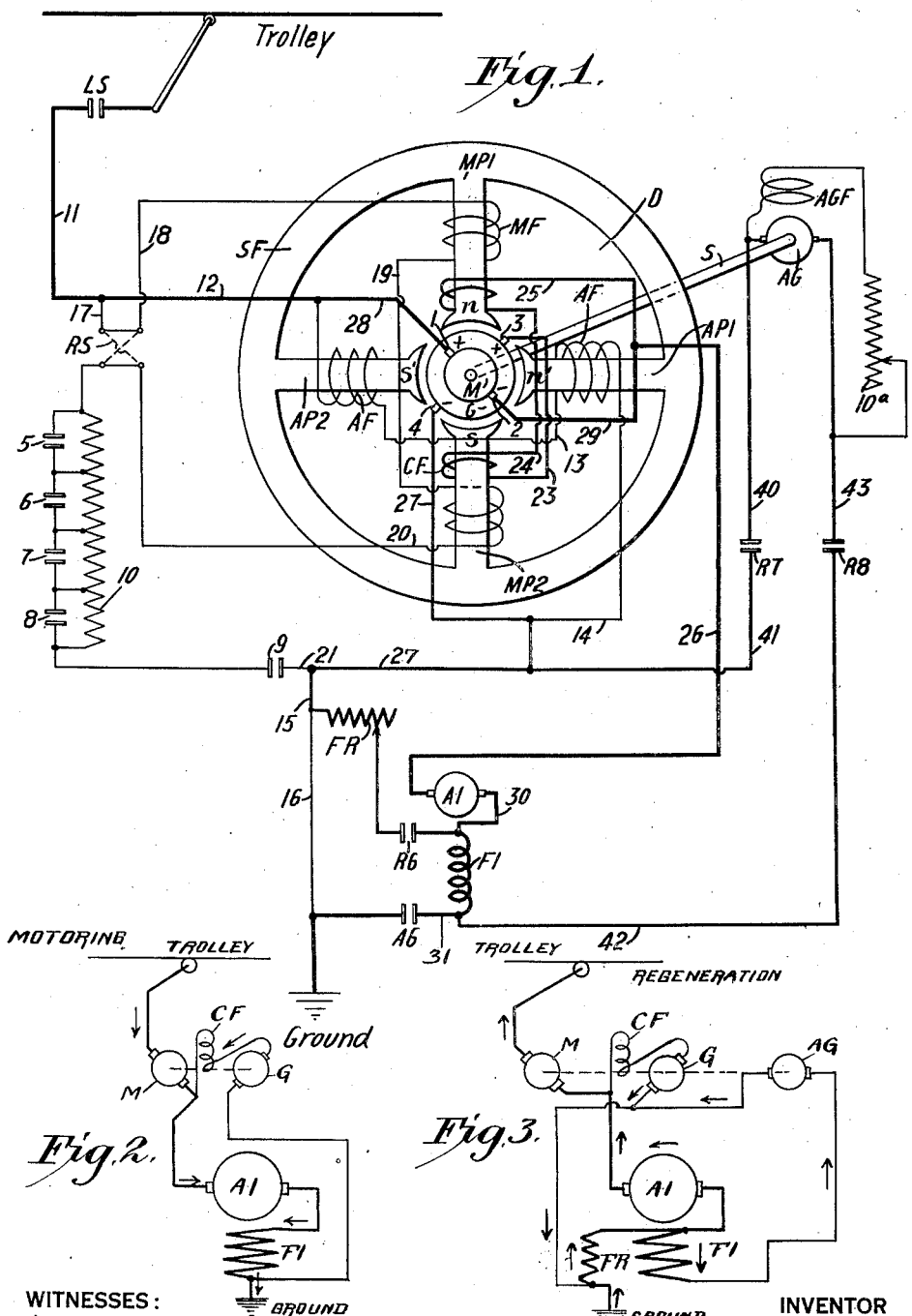

… …

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,315,958.        Specification of Letters Patent.      Patented Sept. 16, 1919.

Application filed April 12, 1916. Serial No. 90,704.

*To all whom it may concern:*

Be it known that I, RUDOLF E. HELLMUND, a subject of the German Emperor, and a resident of Pittsburgh, in the county of Allegheny and State of Pennsylvania, have invented a new and useful Improvement in Systems of Control, of which the following is a specification.

My invention relates to systems of control for dynamo-electric machines and especially to the control of electric railway vehicle motors and the like during both the accelerating and the regenerative periods.

One object of my invention is to provide a relatively simple and economical accelerating system for electric motors, whereby the usual starting resistors may be entirely dispensed with.

Another object of my invention is to provide a special type of double-commutator auxiliary machine for effecting gradual acceleration of a driving motor, an auxiliary exciting armature for the main field-winding circuit during the regenerative period and means for regulating the field-winding current that is received from the exciting armature during the initial portion of the regenerative period and manipulating the relative voltages of the commutators of the first-mentioned machine to subsequently distribute the supply-circuit voltage between the main regenerating machine and one of the auxiliary armature windings and thus permit regenerative operation to a relatively low main-machine speed without requiring the use of further main-circuit resistors.

My invention may best be understood by reference to the accompanying drawing wherein Figure 1 is a diagrammatic view of a system of control embodying my invention, and Fig. 2 and Fig. 3 are simplified diagrammatic views illustrating circuit connections under conditions of both acceleration and regeneration of the main machine, as indicated by the accompanying legends.

Referring to the drawing, the system shown comprises a plurality of suitable supply-circuit conductors respectively marked Trolley and Ground; a main dynamo-electric machine having an armature $A^1$ and a field winding $F^1$ of the series type; a novel type of dynamotor D that is employed during both the accelerating and the regenerating periods in a manner to be described; an auxiliary exciting armature AG that is driven from the dynamotor D by a shaft $s$, for example, and is employed to energize a circuit including the main field winding $F^1$ and a variable resistor FR during the initial portion of the regenerative period; and a plurality of switches LS, 5, 6, 7, 8, 9, $A^6$, $R^6$, $R^7$ and $R^8$. The switch that is used during acceleration only is marked as $A^6$, those switches employed during the regenerative period alone are designated as $R^6$, etc., while the remaining switches are employed during both acceleration and regeneration.

The dynamotor or double-commutator machine D comprises a pair of auxiliary armature windings of a familiar type, here represented by commutator cylinders M and G that are respectively provided with suitable sets of brushes 1 and 2, and 3 and 4, which sets are materially spaced apart circumferentially, for a purpose to be described; a suitable stator frame SF with which are associated a plurality of coöperating sets of main polar projections $MP^1$ and $MP^2$ and auxiliary polar projections $AP^1$ and $AP^2$; a main field winding MF that is associated with the polar projections $MP^1$ and $MP^2$, an auxiliary field winding AF that is wound upon the auxiliary projections $AP^1$ and $AP^2$, and a compensating field winding CF that is disposed upon the main projections $MP^1$ and $MP^2$.

Considering the field-winding and armature connections of the dynamotor D in detail, one field-winding circuit is established from the line switch LS through conductors 11 and 12, the coil of the field winding AF that is disposed on the polar projection $AP^2$, conductor 13, the coöperating field coil that is disposed upon the projection $AP^1$ and conductors 14, 15 and 16 to the negative conductor Ground. A second field circuit is completed from conductor 11 through conductor 17, certain contact members of a reversing switch RS which is here shown in a conventional manner, conductor 18, the coil of the field winding MF that is wound on the main polar projection $MP^1$, conductor 19, the coöperating field of coil that is disposed upon the projection $MP^2$, conductor 20, certain other contact members of the reversing switch RS, resistor 10 which is adapted to be short-circuited in sections by the switches 5 to 8, inclusive, switch 9 and conductor 21 to the negatively-connected conductor 15, The main machine circuit includes the trolley, line switch LS, conductors 11, 12 and 28, commutator cylinder M, conductors 29 and 26, main armature $A^1$, conductor 30, main field winding $F^1$, conductor 31, and switch $A^6$, when closed, to ground.

Another circuit is continued from the commutator cylinder M through conductors 29 and 25, one coil of the field winding CF that is wound upon the main polar projection $MP^1$, conductor 24, the allied field coil that is wound upon the main polar projection $MP^2$, conductor 23, commutator cylinder G, and conductors 27, 15 and 16 to ground.

The auxiliary armature winding that is associated with the commutator cylinder M is thus connected in series relation with the main machine, while the other auxiliary armature winding, corresponding to the commutator cylinder G, is connected through the field winding CF, in parallel relation, to the main machine.

By reason of the illustrated arrangement of circuits, the auxiliary generator armature winding, corresponding to the commutator cylinder G, adds current to that derived from the supply circuit during the motoring or accelerating period of the main machine, such added current being utilized to excite the field winding CF, for example.

During the regenerative period when switches $R^6$, $R^7$ and $R^8$ are closed, an exciting circuit is established from one terminal of the auxiliary exciting armature AG through conductor 40, switch $R^7$, conductors 41 and 15, variable resistor FR, switch $R^6$, main field winding $F^1$, conductor 42, switch $R^8$, main conductor 43 to the opposite terminal of the exciting armature AG. A suitable field-magnet winding AGF is shown as connected in series relation with a variable resistor $10^a$ across the armature AG.

Normally, that is to say, at the beginning of the accelerating period, the polar projections of the dynamotor D are energized by the corresponding field windings MF and AF to produce the polarities that are indicated by the plus and minus signs of the brushes and the characters $n$, $s$, $n'$ and $s'$ of the polar projections. By reason of the fact that the axis of the main polar projections lies intermediate the pairs of non-corresponding brushes (that is, brushes on different commutator cylinders) 1 and 3, and 2 and 4, respectively, while the axis of the auxiliary polar projections $AP^1$ and $AP^2$ passes intermediate the pairs of non-corresponding brushes 3 and 2, and 1 and 4, respectively, it follows that the flux produced by both sets of polar projections threads the armature winding that is associated with the commutator cylinder M in mutually aiding directions, thereby having an additive effect upon the voltage of the corresponding auxiliary armature winding; while the sets of fluxes in question link with the armature winding that is associated with the commutator cylinder G in opposite directions, thereby producing a differential effect upon the voltage of the corresponding armature winding. For example, if the field windings MF and AF are suitably energized at the beginning of the accelerating period, the voltage between the brushes 1 and 2 will substantially equal the supply-circuit voltage, while the voltage between the brushes 3 and 4 will be substantially zero. Since the brushes 3 and 4 are connected across the main dynamo-electric machine, it follows that the starting voltage thereof may be of any desirably low value.

By varying the ratio of voltages of the commutator cylinders M and G; or in other words, by changing the distribution of supply-circuit voltage between the cylinders M and G as set forth in detail later, the voltage that is impressed upon the main machine may be increased until substantially full supply-circuit voltage is impressed thereupon, which requires that the voltage of the commutator cylinder G shall also be equal to substantially supply-circuit voltage, while the voltage of the first auxiliary armature winding cylinder M is reduced to substantially zero.

The function of the compensating field winding CF is to produce a differential compound effect upon the flux that is created by the main field winding MF and thus prevent relatively sudden or large increases of regenerated current. For example, if the voltage of the main machines, particularly during the regenerative period, approaches a predetermined dangerous or undesirable value, the current traversing the compensating field winding CF, which is connected in series relation with the commutator cylinder G, is correspondingly increased and thereby opposes a certain magneto-motive force to the normal magneto-motive force of the field winding MF, thus causing a reduction of the main-machine voltage. The converse effect takes place in the event of a certain decrease of main-machine voltage. It will be understood that, if desired, the compensating field winding CF may be connected in series relation with the main machine, or in any other suitable manner, to produce the desired compounding effect.

During the operation of the system under consideration, the magnetizing effect of the auxiliary armatures is of sufficient importance to be considered in connection with the design of the dynamotor. The initial polarity of the sets of brushes 1 and 2 and 3 and 4 is indicated by the plus and minus signs in the figure. At the moment of starting, a relatively heavy low-voltage current flows through the brushes 3 and 4 of the commutator cylinder G and, therefore, the zone of armature magnetizing effect lies principally along the line joining brushes 3 and 4. Consequently, the armature magnetizing effect in this case merely strengthens the desired relations of the field-winding fluxes of the dynamotor, thereby permitting the field-winding coils to be more economically designed, that is to provide fewer ampere-turns than would be necessary were it not for the armature magnetizing effect just mentioned. On the other hand, at the end of the accelerating period when practically all of the current flows through the other set of brushes 1 and 2 of the commutator cylinder M, which at that time is of substantially zero voltage, the zone of armature magnetizing effect is chiefly along the line of the axis of the brushes 1 and 2, and again the armature magnetizing effect aids the desired disposition of the field-winding fluxes. Although the dynamotor D is shown without commutating polar projections, it will be appreciated that such projections may be provided, if so desired.

Assuming that it is desired to effect acceleration of the main motor, the switches LS, 5, 6, 7, 8, 9 and A⁶ are closed, with the reversing switch RS occupying what may be termed its forward or initial position. A simplified diagram of connections is shown in Fig. 2. As previously stated, the armature winding that is associated with the commutator cylinder M, which is connected in series relation with the main motor, receives substantially the full supply-circuit voltage at the instant of starting, while the other commutator cylinder G and the parallel-related main motor have substantially zero or a relatively low voltage impressed upon them, such conditions being effected when the auxiliary resistor 10 is completely short-circuited.

The switches 5, 6, 7 and 8 are then gradually opened, whereby the above-mentioned additive effect of the field-winding fluxes upon the armature winding that is associated with the commutator cylinder M, and the differential effect of such fluxes upon the other auxiliary armature winding that is connected to the commutator cylinder G become effective, as the strength of the main field winding MF is gradually decreased by reason of the successive opening of the switches 5 to 8, inclusive.

To effect still further motor acceleration, the reversing switch RS may then be actuated to its reversed position, whereby the main field winding MF acts to energize the main polar projections in the opposite manner from the initial energization and thereby serves to continue the desired gradual increase of voltage between the brushes 3 and 4 and a corresponding gradual decrease of voltage between the brushes 1 and 2 as the switches 5, 6, 7 and 8 are successively closed. At this time the main motor is connected through the auxiliary armature winding that is associated with the commutator cylinder M, which is of substantially zero voltage, across the supply circuit, thereby receiving substantially full supply-circuit voltage.

Although, for the sake of simplicity and clearness, I have shown and described only one main motor, it will be understood that any desired number of motors, employing the familiar series-parallel or other types of control, may be employed, if desired.

Assuming that the reversing switch RS occupies the reversed or final accelerating position and that it is desired to effect the regenerative operation of the main momentum-driven machine, the switches R⁶, R⁷ and R⁸ are first closed to effect auxiliary excitation of the main field winding F¹ and thereby build up the voltage of the main armature A¹; and the switches LS and 5 to 9, inclusive, are then closed. The simplified diagram of connections is shown in Fig. 3.

Under such conditions, the voltage of the commutator cylinder M is substantially zero, while the voltage of the commutator cylinder G and of the main machine is slightly higher than the line voltage, corresponding to conditions at the end of the accelerating period; and, as the main machine speed decreases, the field-circuit resistor FR may be varied, either manually or automatically, in any suitable manner to preferably maintain a substantially constant regenerated current during the initial portion of the retardation period. However, such field-current regulation in itself forms no part of my present invention but is fully set forth and claimed in my co-pending application, Serial No. 44,443, filed August 9, 1915, to which reference may be had for a more extended description.

When the field-circuit resistor FR is entirely excluded from circuit, so that a substantially constant current is supplied to the main field winding F¹ from the exciting armature AG, the dynamotor D may be brought into operation to continue the regenerative operation of the main machine.

Such operation of the dynamotor D is similar to the previously-described operation in connection with motor acceleration, in that the switches 5 to 8, inclusive, are initially successively opened in any suitable manner. The reversing switch RS is then thrown to its forward or initial accelerating position and then the switches 5, 6, 7 and 8 may be closed in turn to continue the desired increase of voltage upon the commutator cylinder M, which is connected in series with the main machine, and a corresponding decrease of voltage upon the cylinder G which is disposed in parallel relation to the main machine. Thus, the voltage of the main armature A¹ gradually decreases as the speed of the momentum-driven vehicle is reduced, and regenerative braking is maintained until a relatively low vehicle speed is attained.

If desired, the auxiliary armature AG may be dispensed with during the regenerative period, and the armature winding that is associated with commutator cylinder G may be adapted to perform a function similar to that of the auxiliary generator armature AG, as set forth and claimed in my copending application, Serial No. 66,725, filed December 14, 1914.

I do not wish to be restricted to the specific circuit connections and location and arrangement of parts herein set forth, as various modifications thereof may be made without departing from the spirit and scope of my invention. I desire, therefore that only such limitations shall be imposed as are indicated in the appended claims.

I claim as my invention:

1. In a system of control, the combination with a supply circuit and a motor having an armature and a field winding, of a dynamotor embodying a plurality of auxiliary armature windings one of which is connected in series relation with said motor and also embodying a plurality of field windings, and means for varying the auxiliary field-winding fluxes including means for relatively reversing certain of the field windings to effect a gradual voltage variation of one of said auxiliary armature windings from substantially supply-circuit voltage to substantially zero voltage.

2. In a system of control, the combination with a supply circuit and a motor having an armature and a field winding, of a dynamotor embodying a plurality of auxiliary armature windings respectively connected in series relation with, and in parallel relation to, said motor, and also embodying a plurality of field windings, and means for relatively varying the auxiliary field-winding fluxes including means for relatively reversing certain of the field windings to effect a gradual voltage variation of the first auxiliary armature winding from substantially supply-circuit voltage to substantially zero voltage and a converse variation of the second auxiliary armature winding voltage, whereby the voltage impressed upon the motor is gradually increased.

3. In a system of control, the combination with a supply circuit and a motor having an armature and a field winding, of a dynamotor comprising two auxiliary armature windings severally provided with commutator cylinders, a plurality of spaced sets of brushes for the commutator cylinder, said auxiliary armature windings being respectively connected through the respective sets of brushes in series relation with, and in parallel relation to, said motor, a plurality of spaced sets of field-magnet polar projections having their axes lying intermediate non-corresponding pairs of brushes and a plurality of field windings for said polar projections, and means for relatively varying the auxiliary field-winding fluxes to effect a gradual voltage variation between one set of brushes from substantially supply-circuit voltage to substantially zero voltage and a converse variation of the voltage between the second set of brushes, whereby the voltage impressed upon the motor is gradually increased.

4. In a system of control, the combination with a supply circuit and a motor having an armature and a field winding, of a dynamotor embodying a plurality of auxiliary armature windings respectively connected in series relation with, and in parallel relation to, said motor, and also embodying a plurality of field windings, a variable resistor and a reversing switch in circuit with one auxiliary field winding, and means for varying said resistor with said reversing switch in one position and for subsequently reversely varying the resistor with the reversing-switch in the other position to effect a gradual voltage variation of the first auxiliary armature winding from substantially supply-circuit voltage to substantially zero voltage and a converse variation of the second auxiliary armature winding voltage, whereby the voltage impressed upon the motor is gradually increased.

5. In a system of control, the combination with a supply circuit and a main dynamo-electric machine having an armature and a field winding, of a plurality of auxiliary dynamo-electric machine armatures respectively connected in series relation with, and in parallel relation to, said main machine, an auxiliary exciting armature for the main field-winding circuit, means for varying the field-circuit resistance, and means for varying the distribution of voltage between the main machine and the auxiliary armatures.

6. In a system of control, the combination with a supply circuit and a main dynamo-electric machine having an armature and a field winding, of a plurality of auxiliary dynamo-electric machine armatures respectively connected in series relation with, and in parallel relation to, said main machine, an auxiliary exciting armature for the main field-winding circuit and rotatable with the auxiliary armatures, a variable resistor included in circuit with said exciting armature, and means for varying the field-circuit resistor and means for varying the distribution of voltage between the main machine and the first auxiliary armature under predetermined conditions.

7. In a system of control, the combination with a supply circuit and a momentum-driven main dynamo-electric machine having an armature and a field winding, of a plurality of auxiliary dynamo-electric machine armatures respectively connected in series relation with, and in parallel relation to, said main machine, an auxiliary exciting armature for the main field-winding circuit and rotatable with the auxiliary armatures, a variable resistor included in circuit with said exciting armature, and means for varying the field-circuit resistor and means for varying the distribution of voltage between the main machine and the first auxiliary armature to maintain a substantially constant regenerated current as the speed of the main machine decreases.

8. In a system of control, the combination with a supply circuit and a momentum-driven main dynamo-electric machine having an armature and a field winding, of a dynamotor embodying a plurality of auxiliary armature windings respectively connected in series relation with, and in parallel relation to, said main machine, and also embodying a plurality of field windings, an auxiliary exciting armature for the main field-winding circuit and rotatable with the auxiliary armatures, a variable resistor included in circuit with said exciting armature, and means for varying the field-circuit resistor and means for relatively varying the auxiliary field-winding fluxes to correspondingly vary the voltage distribution between the main machine and the first auxiliary armature.

9. In a system of control, the combination with a supply circuit and a momentum-driven main dynamo-electric machine having an armature and a field winding, of a dynamotor embodying a plurality of auxiliary armature windings respectively connected in series relation with, and in parallel relation to, said main machine, and also embodying a plurality of field windings, an auxiliary exciting armature for the main field-winding circuit and rotatable with the auxiliary armatures, a variable resistor included in circuit with said exciting armature, means for varying the field-circuit resistor, and means for relatively varying the auxiliary field-winding fluxes to effect a gradual voltage variation of the first auxiliary armature winding from substantially zero voltage to substantially supply-circuit voltage and a converse variation of the second auxiliary armature winding voltage as the main machine speed decreases.

10. In a system of control, the combination with a supply circuit and a momentum-driven main dynamo-electric machine having an armature and a field winding, of a dynamotor embodying a plurality of auxiliary armature windings respectively connected in series relation with, and in parallel relation to, said main machine, and also embodying a plurality of field windings, an auxiliary exciting armature for the main field-winding circuit and rotatable with the auxiliary armatures, a variable resistor included in circuit with said exciting armature, means for varying the field-circuit resistor, and means for relatively varying the auxiliary field-winding fluxes including means for relatively reversing certain of the field windings to effect a gradual voltage variation of the first auxiliary armature winding from substantially zero voltage to substantially supply-circuit voltage and a converse variation of the second auxiliary armature winding voltage to maintain a substantially constant regenerated current as the main machine speed decreases.

11. In a system of control, the combination with a supply circuit and a dynamo-electric machine having an armature and a field winding and adapted for both acceleration and regeneration, of a plurality of auxiliary dynamo-electric machine armatures respectively connected in series relation with, and parallel relation to, said main machine, switching means for effecting a variation of the relative distribution of supply-circuit voltage between the main machine and the first auxiliary armature to effect acceleration of the main machine, an auxiliary exciting armature for the main field-winding circuit during regeneration and rotatable with the auxiliary armatures, a variable resistor in circuit with said exciting armature, and means for varying the field-circuit resistor, said switching means being again employed to effect an opposite variation of the relative distribution of voltage between the main machine and the first auxiliary machine armature as the main machine speed decreases.

12. In a system of control, the combination with a supply circuit, and a dynamo-electric machine having an armature and a field winding and adapted for both acceleration and regeneration, of a dynamotor embodying a plurality of auxiliary armature windings respectively connected in series relation with, and in parallel relation to, said main machine, and also embodying a plurality of field windings, switching means for effecting relative variations of the auxiliary field-winding fluxes to correspondingly vary the relative distribution of supply-circuit voltage between the main machine and the first auxiliary armature to effect acceleration of the main machine, an auxiliary exciting armature for the main field-winding circuit during regeneration and rotatable with the auxiliary armatures, a variable resistor in circuit with said exciting armature, and means for varying said field-circuit resistor, said switching means being again employed to effect an opposite variation of the said relative distribution of voltage as the main machine speed decreases.

13. In a system of control, the combination with a supply circuit, and a dynamo-electric machine having an armature and a field winding and adapted for both acceleration and regeneration, of a dynamotor embodying a plurality of auxiliary armature windings respectively connected in series relation with, and in parallel relation to said main machine, and also embodying a plurality of field windings, switching means for effecting relative variations of the auxiliary field-winding fluxes to produce a gradual voltage variation of the first auxiliary armature winding from substantially supply-circuit voltage to substantially zero voltage and a converse variation of the second auxiliary armature voltage to effect acceleration of the main machine, an auxiliary exciting armature for the main field-winding circuit during regeneration and rotatable with the auxiliary armatures, a variable resistor in circuit with said exciting armature, and means for varying said field-circuit resistor, said switching means being again employed to effect an opposite variation of the auxiliary armature winding voltages as the main machine speed decreases.

14. In a system of control, the combination with a supply circuit, and a dynamo-electric machine having an armature and a field winding and adapted for both acceleration and regeneration, of a dynamotor embodying a plurality of auxiliary armature windings respectively connected in series relation with, and in parallel relation to, said main machine, and also embodying a plurality of field windings, switching means for effecting relative variations of the auxiliary field-winding fluxes to produce a gradual voltage variation of the first auxiliary armature winding from substantially supply-circuit voltage to substantially zero voltage and a converse variation of the second auxiliary armature voltage to effect acceleratiton of the main machine, said switching means including means for relatively reversing certain of the field windings, an auxiliary exciting armature for the main field-winding circuit during regeneration and rotatable with the auxiliary armatures, a variable resistor in circuit with the exciting armature, and means for varying said field-circuit resistor, said switching means and said reversing means being again employed in such a manner as to effect an opposite variation of the auxiliary armature winding voltages as the main machine speed decreases.

15. The method of operating a main dynamo-electric machine in conjunction with a plurality of auxiliary armatures during the regenerative period that consists in initially connecting said auxiliary armatures in series relation with, and in parallel relation to, said main machine, and in circuit with the main field winding, respectively, and varying the field-circuit resistance and the distribution of voltage between the first two auxiliary machine armatures as the main machine speed decreases.

16. The method of operating a main dynamo-electric machine during the regenerative period in conjunction with an auxiliary exciting armature winding, a resistor and a dynamotor comprising a plurality of auxiliary armature windings and a plurality of field windings that consists in initially connecting the dynamotor armature windings and the exciting armature winding in series relation with, and in parallel relation to, said main machine, and in circuit with the main field winding and said resistor, respectively, varying said resistor during the first portion of the regenerative period, and then relatively varying the auxiliary field-winding fluxes to effect a gradual voltage variation of the first dynamotor armature winding from substantially zero voltage to substantially supply-circuit voltage and a converse variation of the parallel-related main machine and second dynamotor armature winding, whereby a substantially constant regenerated current obtains.

In testimony whereof, I have hereunto subscribed my name this 29th day of March, 1916.

RUDOLF E. HELLMUND.